Aug. 13, 1963 H. N. TENGLER ET AL 3,100,618
FORE AND AFT SHOCK ABSORBER
Filed Aug. 2, 1960 3 Sheets-Sheet 1
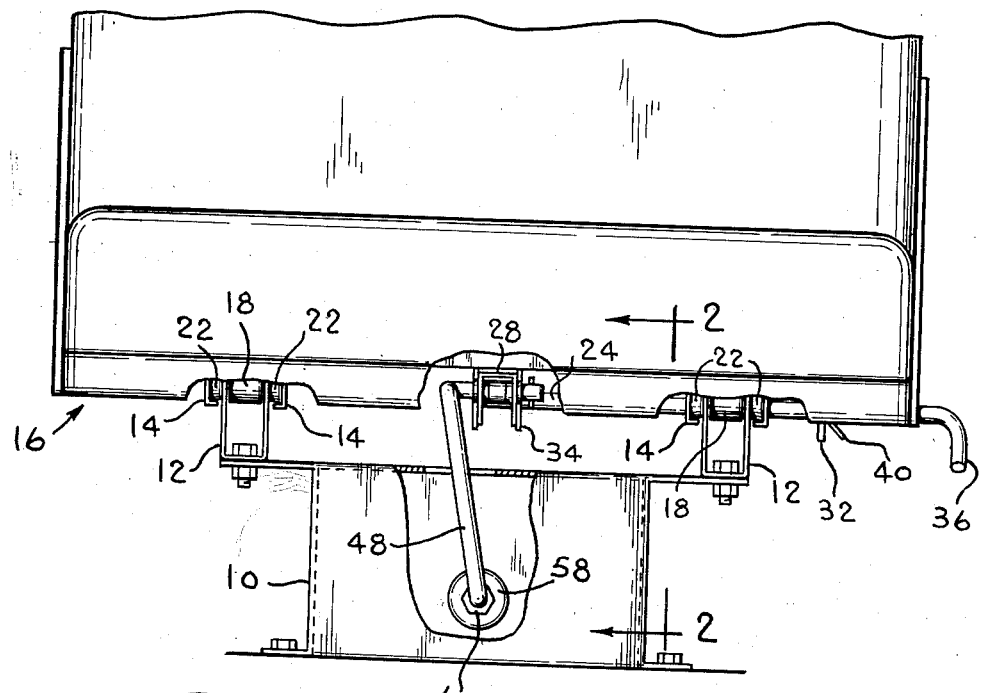
FIG. 1
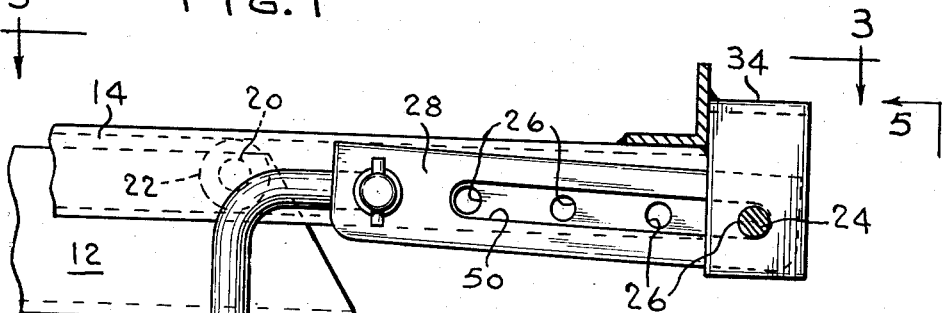
FIG. 2
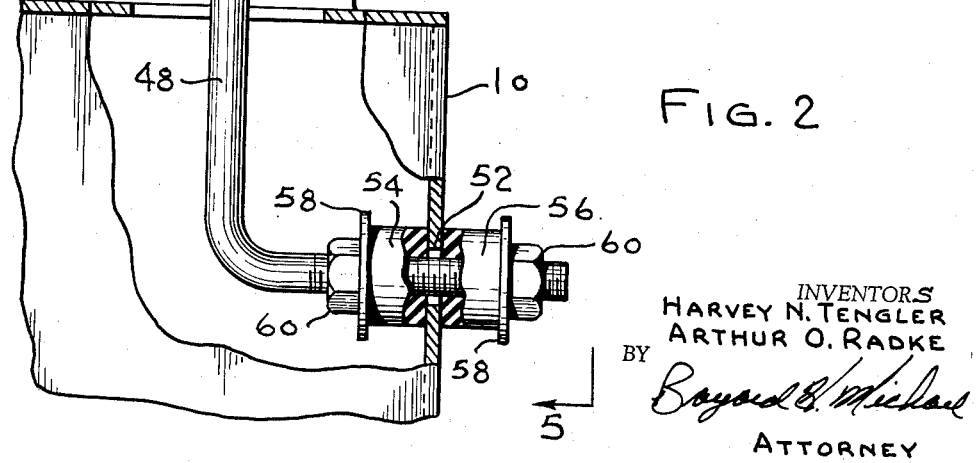
INVENTORS
HARVEY N. TENGLER
ARTHUR O. RADKE
BY
ATTORNEY

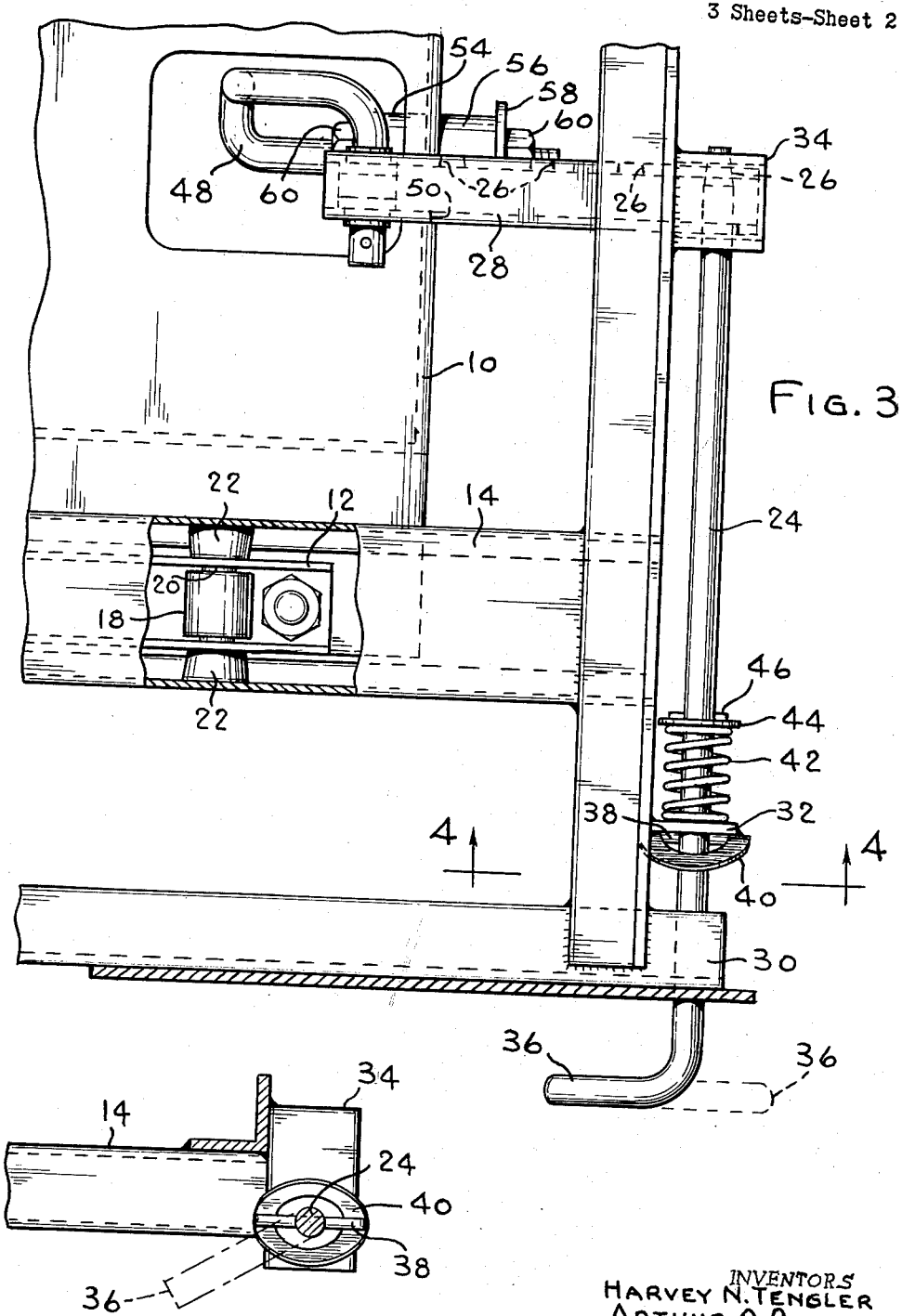

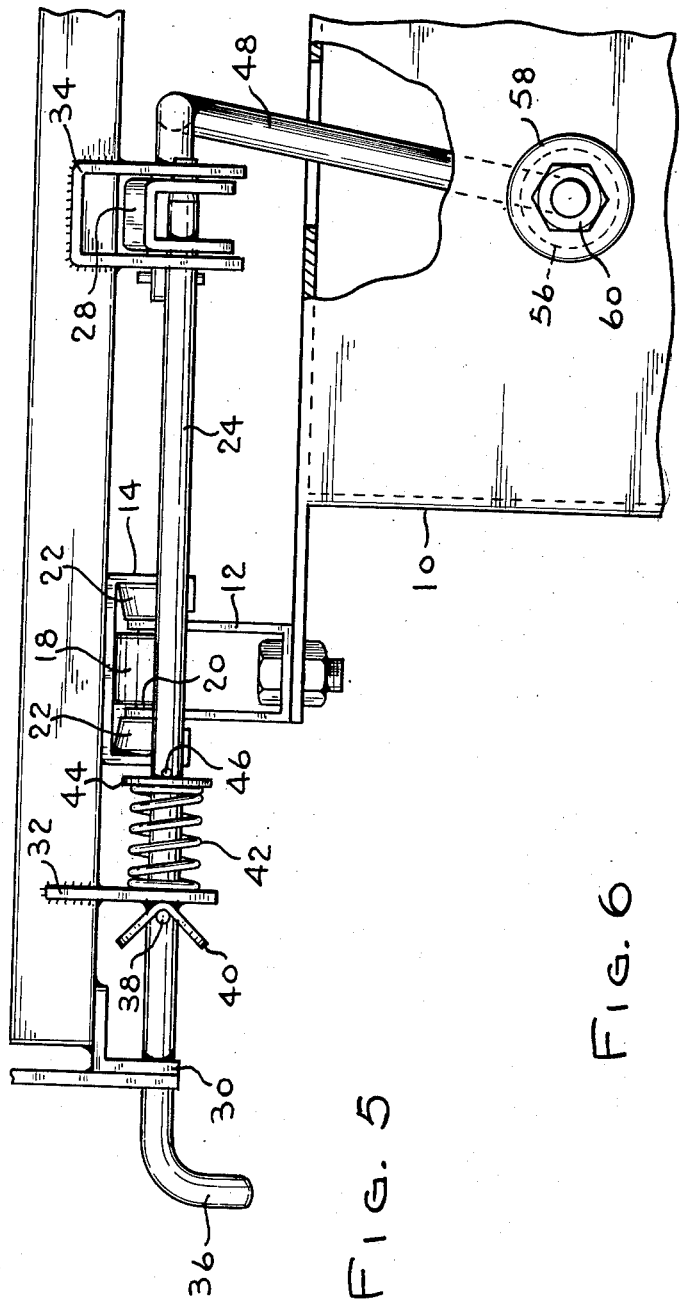
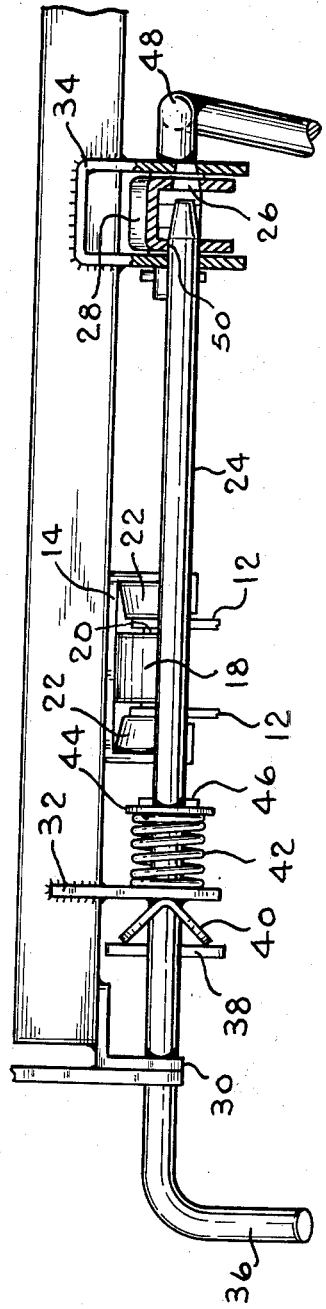

United States Patent Office 3,100,618
Patented Aug. 13, 1963

3,100,618
FORE AND AFT SHOCK ABSORBER
Harvey N. Tengler, West Allis, and Arthur O. Radke, Wauwatosa, Wis., assignors to Bostrom Manufacturing Company, Milwaukee, Wis., a corporation of Wisconsin
Filed Aug. 2, 1960, Ser. No. 46,987
2 Claims. (Cl. 248—430)

This invention relates to a seat support for isolating a seat from fore and aft shocks.

The principal object of this invention is to provide an improved rugged, low cost shock absorbing mechanism for isolating a vehicle seat from fore and aft shocks.

Another object is to simplify the fore and aft shock assembly by incorporating it into the seat adjusting assembly.

Other objects and advantages will be pointed out in, or be apparent from, the specification and claims, as will obvious modifications of the single embodiment shown in the drawings, in which:

FIG. 1 is a view in front elevation of a vehicle seat embodying the present invention and having portions broken away to show the roller mounts and the interconnection between the seat shock absorber and the movable seat carriage.

FIG. 2 is an enlarged view taken on line 2—2 of FIG. 1 and having a portion broken away to show the connection between the shock absorber and vehicle body.

FIG. 3 is a view taken on line 3—3 of FIG. 2 having a portion broken away to show the rollers upon which the carriage rides.

FIG. 4 is a view taken on line 4—4 of FIG. 3 showing the release mechanism for the seat adjusting mechanism.

FIG. 5 is a view taken on line 5—5 of FIG. 2 showing the seat adjusting mechanism locked in position.

FIG. 6 is a view similar to FIG. 5 showing the seat adjusting bar withdrawn to free the seat for fore or aft adjustment.

Referring to the drawings, stationary support 10 is connected to the vehicle body and includes a pair of U-shaped brackets 12 on each side of the support. Each pair of brackets is aligned with a rail 14 secured to the bottom of the seat 16 and includes roller assemblies to support the seat for fore and aft movement. Each roller assembly includes a cylindrical roller 18 rotatably carried on a pin 20 between the upstanding bracket portions. The ends of the pin project beyond these bracket portions to rotatably support the generally frusto-conical outer rollers 22. The rollers guide and support rails 14, which are turned under the outer rollers to vertically fix the rails on the brackets.

The seat moves freely on the rollers and can be locked in a number of fore and aft positions by inserting rod 24 in any one of the holes 26 in channel member 28, which is secured to the support 10 as described hereinafter. The latch rod is suspended beneath the seat for longitudinal movement in L-bracket 30, plate 32 and inverted channel 34.

Referring to FIGS. 5 and 6, the rod is released from the holes by rotating handle 36 on the end of the rod downward so that pin 38 rides outward on cam washer 40 secured to plate 32. Outward movement of the rod will compress spring 42 between plate 32 and washer 44 which is held in position by pin 46. When the seat is located in approximately the desired position, the handle is rotated upward and the rod will move inward due to the bias of the spring. If one of the holes 26 are aligned with the rod, it will project through the hole, locking the seat in position. If the seat is not properly aligned, the rod will bear against the inside surface of channel member 28 and on fore or aft movement, the rod will snap into the first hole, which is moved into alignment with the rod.

The channel member 28 is pivoted on the end of rod 48 and is provided with a slot 50 through which rod 24 extends. The channel will ride on the rod during fore and aft movement of the seat, and the slot prevents seat from being moved too far in either direction so that it falls off of the rollers. The rod 48 is bent in three right angles to extend through hole 52 provided in the wall of support 10. Rubber bushings 54 and 56 are mounted on the lower end of rod 48 on either side of the wall and are held in position by washers 58 and nuts 60. Referring to FIG. 2 it can be seen that any fore and aft motion of the seat will cause the rod 48 to pivot at the intersection of the rod and wall of the support 10. On forward motion, the lower portion of bushing 54 and the upper portion of bushing 56 will be compressed, and on aft motion, the upper portion of bushing 54 and the lower portion of bushing 56 will be compressed. Any abrupt motion either fore or aft will therefore be quickly absorbed by the bushings. This structure is of simple construction and combines the seat adjusting and shock absorbing assembly into a single unit.

Although but a single embodiment of the present invention has been illustrated and described, it will be apparent to those skilled in the art that various changes and modifications may be made therein without departing from the spirit of the invention or from the scope of the appended claims.

We claim:

1. A vehicle seat support comprising, a stationary member fixed to the vehicle, a carriage member mounted on the stationary member and movable longitudinally with respect to the stationary member, anti-friction means between the stationary member and carriage member, a shock absorber including a rod having a transversely extending end and a longitudinally extending end, the transversely extending end being pivotally connected to one of the members, the longitudinally extending end being pivotally connected to the other member through yieldable resilient means.

2. The seat support according to claim 1 in which the stationary member includes a plate having an aperture therein, the longitudinally extending end of the rod passing through the aperture, the yieldable resilient means comprising a bushing on either side of the plate, means for capturing the bushings on the rod so that the longitudinal end of the rod has a tendency to pivot in response to fore and aft movements of the carriage member at the point of intersection of the longitudinal end of the rod with the plate.

References Cited in the file of this patent

UNITED STATES PATENTS

| | | |
|---|---|---|
| 2,171,947 | Parker | Sept. 5, 1939 |
| 2,346,895 | Bergman | Apr. 18, 1944 |
| 2,932,342 | Simons | Apr. 12, 1960 |

FOREIGN PATENTS

| | | |
|---|---|---|
| 8,912 | Australia | Aug. 18, 1927 |